(12) United States Patent
Shen

(10) Patent No.: US 9,612,902 B2
(45) Date of Patent: Apr. 4, 2017

(54) METHODS AND APPARATUS FOR MAXIMUM UTILIZATION OF A DYNAMIC VARYING DIGITAL DATA CHANNEL

(71) Applicant: TVU Networks Corporation, Mountain View, CA (US)

(72) Inventor: Paul Shen, Woodside, CA (US)

(73) Assignee: TVU Networks Corporation, Mountain View, CA (US)

( * ) Notice: Subject to any disclaimer, the term of this patent is extended or adjusted under 35 U.S.C. 154(b) by 0 days.

(21) Appl. No.: 13/790,231

(22) Filed: Mar. 8, 2013

(65) Prior Publication Data

US 2013/0238960 A1 Sep. 12, 2013

Related U.S. Application Data

(60) Provisional application No. 61/609,520, filed on Mar. 12, 2012.

(51) Int. Cl.
*G06F 11/10* (2006.01)
*H04L 1/00* (2006.01)

(52) U.S. Cl.
CPC ............ *G06F 11/10* (2013.01); *H04L 1/0009* (2013.01); *H04L 1/0023* (2013.01); *H04L 1/0041* (2013.01)

(58) Field of Classification Search
CPC ... H03M 13/09; H03M 13/091; H04L 1/0061; H04L 1/0057; H04L 1/0045;
(Continued)

(56) References Cited

U.S. PATENT DOCUMENTS

| 6,154,489 A | 11/2000 | Kleider et al. |
| 6,262,994 B1 | 7/2001 | Dirschedl et al. |

(Continued)

FOREIGN PATENT DOCUMENTS

| CN | 1469662 | 1/2004 |
| CN | 101044695 | 9/2007 |
| WO | 2006/042330 | 4/2006 |

OTHER PUBLICATIONS

International Search Report for PCT/US2013/030102, dated May 14, 2013, 1 page.
(Continued)

*Primary Examiner* — Albert Decady
*Assistant Examiner* — Kyle Vallecillo
(74) *Attorney, Agent, or Firm* — Lipsitz & McAllister, LLC

(57) ABSTRACT

Apparatus and methods for maximizing utilization of a dynamically varying channel are provided. A transmitter encodes and transmits data over one or more digital data channels. A forward error correction coder is associated with the transmitter for error correction coding of one or more blocks of the data. The one or more blocks of error correction coded data are transmitted at a predetermined transmitting rate over the one or more digital data channels to a receiving module. A rate control module is provided for controlling a data rate of the transmitter and the sending of the error correction coded data of the forward error correction coder based on feedback from the receiving module. The feedback may comprise a receiving data rate of received data.

22 Claims, 1 Drawing Sheet

(58) Field of Classification Search
CPC ... H04L 1/0023; H04L 1/0009; H04L 1/0041; G06F 11/10; H04N 19/67
USPC .................. 714/758, 760, 761, 762
See application file for complete search history.

(56) References Cited

U.S. PATENT DOCUMENTS

| | | | |
|---|---|---|---|
| 6,553,534 B2 | 4/2003 | Yonge, III et al. | |
| 7,379,492 B2 | 5/2008 | Hwang | |
| 7,447,977 B2 | 11/2008 | Bauer et al. | |
| 7,752,327 B2 | 7/2010 | Li | |
| 7,956,772 B2 | 6/2011 | Shokrollahi et al. | |
| 8,015,474 B2 | 9/2011 | Izzat et al. | |
| 8,091,011 B2 | 1/2012 | Rajakarunanayake et al. | |
| 8,094,578 B2 | 1/2012 | Nassor et al. | |
| 2003/0231706 A1 | 12/2003 | Hwang | |
| 2006/0146703 A1* | 7/2006 | Cha et al. | 370/229 |
| 2006/0150055 A1* | 7/2006 | Quinard et al. | 714/752 |
| 2006/0280205 A1* | 12/2006 | Cho | 370/473 |
| 2007/0242744 A1* | 10/2007 | Radha | H04L 1/0002 375/240 |
| 2008/0144571 A1 | 6/2008 | Marinier et al. | |
| 2008/0175163 A1* | 7/2008 | Honary et al. | 370/252 |
| 2009/0034614 A1 | 2/2009 | Liu et al. | |
| 2009/0044079 A1 | 2/2009 | de Lind Van Wijngaarden et al. | |
| 2009/0219990 A1 | 9/2009 | Han et al. | |
| 2010/0171882 A1* | 7/2010 | Cho | H04N 19/67 348/608 |
| 2011/0317561 A1 | 12/2011 | Sau et al. | |
| 2012/0011413 A1* | 1/2012 | Liu | H04L 1/0009 714/746 |

OTHER PUBLICATIONS

Supplementary European Search Report for corresponding application EP 13 76 0791 dated Aug. 13, 2015, 2 pages.

* cited by examiner

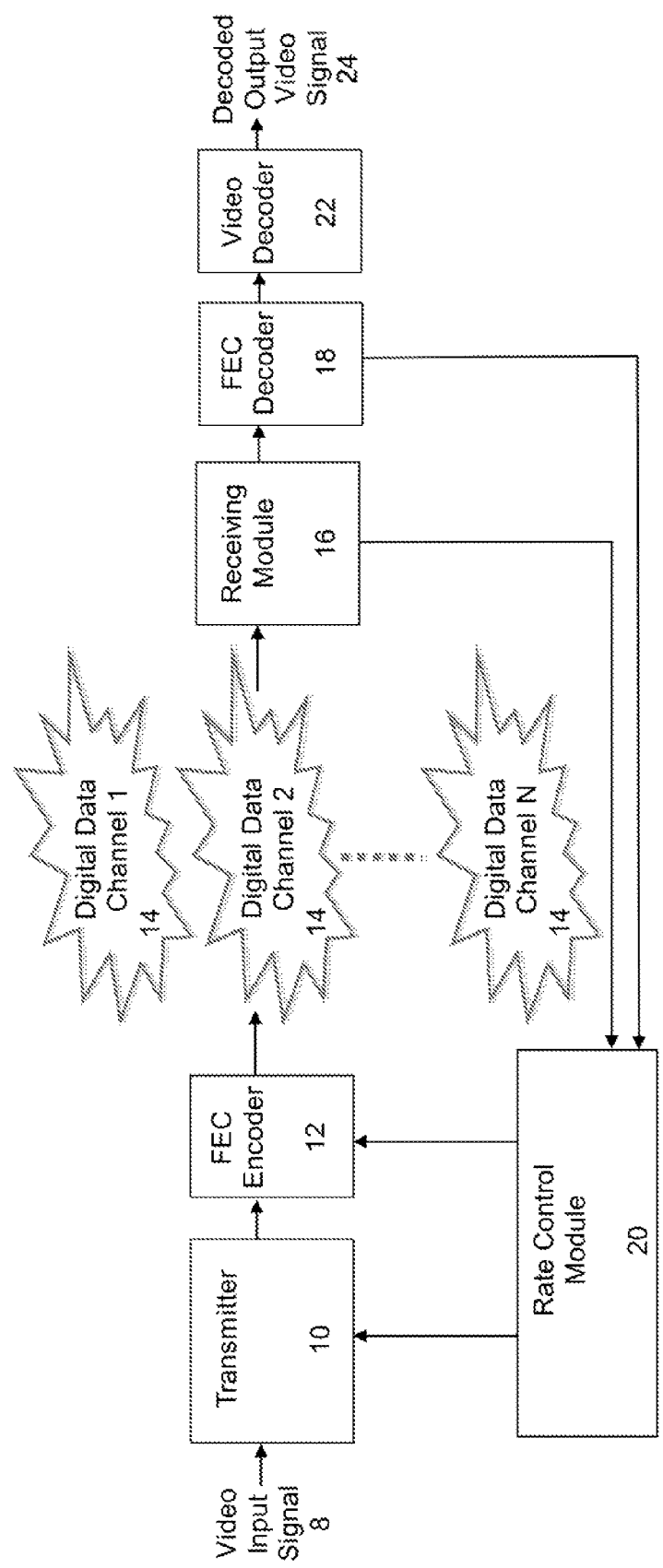

METHODS AND APPARATUS FOR MAXIMUM UTILIZATION OF A DYNAMIC VARYING DIGITAL DATA CHANNEL

This application claims the benefit of U.S. Provisional Application No. 61/609,520 filed on Mar. 12, 2012.

BACKGROUND OF THE INVENTION

The present invention relates to the field of digital data transmission. More specifically, the present invention relates to methods and apparatus for maximum utilization of a dynamic varying digital data channel.

One of the challenges of sending data through a dynamically varying digital data channel is how to send a correct amount of data which matches the actual bandwidth of the digital data channel. If the transmitter is sending too much data, data will be dropped during the transmission. If the transmitter is not sending enough data, the channel bandwidth is not fully utilized. There are a number of different protocols currently used to address this issue. TCP is one such commonly used protocol. However, the TCP protocol does not follow the available channel bandwidth very well. In particular, the TCP protocol also under utilizes the channel bandwidth, especially if the latency between the transmitter and receiver is long.

Error correction coding techniques are used to recover data lost during transmission and are based on the principal of encoding and transmitting redundant sets of data such that the receiver can correct errors without the need for retransmission of data. One example of such an error correction technique is forward error correction (FEC). Such error correction techniques require additional bandwidth for the redundant data. Typically, error correction parameters are set to accommodate acceptable loss rates to provide a tradeoff between data quality and bandwidth. For example, with FEC coding, a fixed coding rate is used to provide a target quality for the receiver based on an expected packet loss rate.

The challenges of maximizing bandwidth usage and dealing with data loss are greater when transmitting real-time data over a dynamic varying channel.

It would be advantageous to provide methods and apparatus for maximizing utilization of a dynamic varying digital data channel for sending real-time data, as well as for sending stored data.

The methods and apparatus of the present invention provide the foregoing and other advantages.

SUMMARY OF THE INVENTION

The present invention relates to methods and apparatus for maximum utilization of a dynamic varying digital channel.

In one example embodiment of an apparatus for maximizing utilization of a dynamically varying channel in accordance with the present invention, a transmitter is provided for encoding and transmitting data over one or more digital data channels. A forward error correction coder is associated with the transmitter for error correction coding of one or more blocks of the data. The one or more blocks of error correction coded data are transmitted at a predetermined transmitting rate over the one or more digital data channels to a receiving module.

A rate control module is provided for controlling a data rate of the transmitter and the sending of the error correction coded data of the forward error correction coder based on feedback from the receiving module. The feedback may comprise at least one of a receiving data rate of received data and an error correction decoding status.

The receiving module may provide a receiving status and error correction decoding status of each block of data to the rate control module.

Based on the feedback, the rate control module will either modify a block transmitting rate of each of the error correction coded blocks of data or notify the forward error correction coder to stop sending any additional error correction coded data for that error correction coded block and begin sending data for a next error correction coded block.

Based on one of a prior or current receiving data rate of the error correction coded data, the transmitter may modify the data rate.

Aggregated error correction coded data of the one or more blocks of data may be sent at the predetermined transmitting rate for each digital data channel, irregardless of an actual bandwidth of the corresponding digital data channel.

Alternatively, aggregated error correction coded data of the one or more blocks of data may be sent at the predetermined transmitting rate for an aggregation of the one or more digital data channels, irregardless of an actual aggregated bandwidth of the digital data channels.

The data may comprise one of real-time data or stored data.

At least one of the one or more digital data channels may be a two-way communication channel.

The transmitter may comprise a variable rate encoder. The forward error correction coder may comprise an FEC encoder using rateless erasure codes. An FEC decoder and a variable rate decoder may be associated with the receiving module.

The present invention also encompasses methods for maximizing utilization of a dynamically varying channel. In accordance with one example embodiment, the method may comprise encoding and transmitting data over one or more digital data channels, error correction coding of one or more blocks of the data, and transmitting the one or more blocks of error correction coded data at a predetermined transmitting rate over the one or more digital data channels to a receiving module.

The method embodiments of the present invention may also include various features of the apparatus embodiments discussed above.

BRIEF DESCRIPTION OF THE DRAWINGS

The present invention will hereinafter be described in conjunction with the appended drawing FIGURE:

FIG. 1 shows a block diagram of an example embodiment of the present invention.

DETAILED DESCRIPTION

The ensuing detailed description provides exemplary embodiments only, and is not intended to limit the scope, applicability, or configuration of the invention. Rather, the ensuing detailed description of the exemplary embodiments will provide those skilled in the art with an enabling description for implementing an embodiment of the invention. It should be understood that various changes may be made in the function and arrangement of elements without departing from the spirit and scope of the invention as set forth in the appended claims.

The methods and apparatus of the present invention use a class of forward error correction methods, rateless erasure codes, and rate control to achieve the maximum utilization of a dynamic varying digital data channel. As rateless erasure codes are used, there is no need to adjust the error correction coding rate or any of the other error correction parameters. As a simplified example, with rateless erasure codes, 1 MB of data may be encoded into 10 MB of error corrected data and transmitted to a receiver at a 50% loss rate, and as long as any random 1 MB of data is recovered at the receiver, the original stream or data can be recovered.

The present invention efficiently uses a digital data channel for communication of data (either real-time data or stored data) by adapting the encoding rate for the data based on feedback from the receiver as to the number of packets received. Therefore, the encoding rate (also referred to herein as the "data rate" of the transmitter) is adjusted to that which the channel or network can support and ensures that the packets arrive on time. The invention is especially applicable to real-time data.

FIG. 1 shows a block diagram of an example embodiment of the invention. A transmitter 10 is provided for encoding and transmitting data over one or more digital data channels 14. The transmitter 10 generates one or more blocks of data from a video input signal 8 and provides them to an associated forward error correction coder (FEC encoder) 12 at a particular data rate. The forward error correction coder performs error correction coding on the one or more blocks of data. The one or more blocks of error correction coded data are transmitted at a predetermined transmitting rate over the one or more digital data channels to a receiving module 16.

For each data block, the FEC encoder 12 will continuously generate redundant error correction symbols, which are transmitted over the one or more digital data channels 14 to the receiving module 16 at the predetermined transmitting rate, regardless of what the actual data rate is.

A rate control module 20 is provided for controlling a data rate of the transmitter 10 and the sending of the error correction coded data of the forward error correction coder 12 based on feedback from the receiving module 16. The feedback may comprise at least one of a receiving data rate of received data and an error correction decoding status.

The receiving module 16 and/or an associated forward error correction decoder (FEC Decoder) 18 may provide a receiving status and error correction decoding status of each block of data to the rate control module 20.

Based on the feedback, the rate control module 20 may modify a block transmitting rate of each of the error correction coded blocks of data. In particular, based on the feedback, the forward error correction coder 12 may be instructed by the rate control module 20 to modify the block transmitting rate of the error correction coded data transmitted for each block of data that is received from the transmitter 10. Thus, although the overall transmitting rate at which the one or more blocks of error correction coded data is sent over the one or more digital data channels 14 remains constant, an individual block transmitting rate for each block of the error correction coded data may be increased or decreased. Due to delay incurred in receiving the feedback, the rate control module 20 will predict whether sufficient data is being sent to the receiver 16 for a particular error correction coded block of data. For example, when the rate control module 20 predicts that sufficient data will be received for an error correction coded block of data, it will instruct the forward error correction coder 12 to reduce the block transmitting rate for that particular error correction coded block of data. Therefore, less unnecessary forward error correction coded data is sent for that particular error correction coded block of data. Conversely, when the rate control module 20 predicts that insufficient data will be received for an error correction coded block of data, it will instruct the forward error correction coder 12 to increase the block transmitting rate for that particular error correction coded block of data. In this instance, additional forward error correction coded data will be sent for that particular error correction coded block of data.

In addition, based on the feedback, the rate control module may notify the forward error correction coder 12 to stop sending any additional error correction coded data for that error correction coded block and begin sending data for a next error correction coded block.

Based on one of a prior or current receiving data rate of the error correction coded data, the transmitter 10 may modify the data rate.

Aggregated error correction coded data of the one or more blocks of data may be sent at the predetermined transmitting rate for each digital data channel 14, irregardless of an actual bandwidth of the corresponding digital data channel 14.

Alternatively, aggregated error correction coded data of the one or more blocks of data may be sent at the predetermined transmitting rate for an aggregation of the one or more digital data channels 14, irregardless of an actual aggregated bandwidth of the digital data channels 14.

The video input signal 8 data may comprise one of real-time data or stored data.

At least one of the one or more digital data channels 14 may be a two-way communication channel. The receiving module 16 will send the feedback information to the rate control module 20 through one or more of such two-way communication channels.

The transmitter 10 may comprise a variable rate encoder. The forward error correction coder 12 may comprise an FEC encoder using rateless erasure codes. The receiving module 16 may provide the received forward error correction coded data to an associated FEC decoder 18. A decoded compressed signal may be provided from the FEC Decoder 18 to a decoder 22 (which may be, for example, a variable rate decoder), which produces a decoded output video signal 24 for display (e.g., at a television, computer, tablet computer, mobile phone, or other display device).

Although FIG. 1 shows the transmitter 10 and forward error correction coder 12 as separate modules, it should be appreciated that the transmitter 10 and forward error correction coder 12 can be combined into an integrated unit. Similarly, although the receiving module 16, the forward error correction decoder 18, and the decoder 22 are shown as separate modules in FIG. 1, it should be appreciated that these modules can also be combined into an integrated unit. In addition, the rate control module 20 is shown as a distinct module in FIG. 1 for ease of explanation, and those skilled in the art should appreciate that various elements of the rate control module 20 can be implemented at either the transmitting end or the receiving end.

As used herein and in connection with FIG. 1, the term "data rate" denotes the rate at which the transmitter 10 sends encoded data to the forward error correction coder 12, the term "transmitting rate" denotes the rate at which the forward error correction coder 12 sends aggregated forward error correction coded data blocks over the digital data channels 14, the term "block transmitting rate" denotes the rate at which an individual block of forward error correction coded data is transmitted, and the term "receiving data rate" is the rate at which the error correction coded data blocks are received at receiving module 16.

In an example embodiment of the present invention, symbols/data blocks will be transmitted over each digital channel at a predetermined transmitting rate which is equal to or greater than the projected channel capacity of the corresponding digital channel 14. The FEC encoder 12 will not stop generating redundant error correction symbols for all the blocks which are currently transmitting until the rate control module 20 instructs it to do so. On the receiving side, the receiver 16 will count the number of symbols for every error correction coded block which it receives. When the receiver 16 has received sufficient symbols for a error correction coded block for the decoder 22 to correctly decode the original data of the receiving block, the receiver 16 will send a decode success status indicator to transmitter rate control module 20. The rate control module 20 will then instruct the FEC encoder 12 to stop generating redundant error correction symbols for that block and to stop sending any more symbols for that block. The FEC encoder 12 will then start to generate redundant error correction symbols for a new block and then start to send error correction coded symbols for the new block.

According to the receiving data rate at which the receiver 16 receives data from the digital data channels 14, the transmitter rate control module 20 will adjust the transmitter 10 to encode the video input signal 8 at a corresponding data rate, in order to match the data rate from the transmitter 10 with the aggregated bandwidth of one or more digital data channels 14. For example, the transmitter 10, which may comprise a variable rate encoder, may be instructed by the rate control module 20 to encode the data at a certain data rate based on the receiving data rate such that the channel bandwidth of the one or more digital data channels 14 is fully utilized. For example, if the receiving data rate is high, more bandwidth is available and the rate control module 20 will instruct the transmitter 10 to increase the data rate, resulting in an increased amount of data being provided to the forward error correction coder 12, which will send the error correction coded block over the digital data channel 14 at the predetermined transmitting rate. Conversely, if the receiving data rate is low, the data rate may exceed the channel bandwidth, and the rate control module 20 may instruct the transmitter 10 to decrease the data rate, resulting in a corresponding decrease in the amount of data being provided to the forward error correction coder 12, which sends the error correction coded block over the digital data channel 14 at the predetermined transmitting rate.

It should now be appreciated that the present invention provides advantageous methods and apparatus for maximum utilization of a dynamic varying digital channel during transmission of stored or real-time data.

Although the invention has been described in connection with various illustrated embodiments, numerous modifications and adaptations may be made thereto without departing from the spirit and scope of the invention as set forth in the claims.

What is claimed is:

1. An apparatus for maximizing utilization of a dynamically varying channel, comprising:
    a transmitter comprising a video source encoder for encoding and transmitting data over one or more digital data channels;
    a forward error correction coder associated with the video source encoder for error correction coding of one or more blocks of the data, the forward error correction coder receiving the data from the video source encoder at an encoding data rate;
    the one or more blocks of error correction coded data being transmitted from the forward error correction coder at a predetermined constant transmitting rate over the one or more digital data channels to a receiving module; and
    a rate control module for controlling the encoding data rate of the video source encoder and for maintaining the predetermined constant transmitting rate of the error correction coded data of the forward error correction coder based on feedback from the receiving module;
    wherein, based on the feedback, the rate control module modifies the encoding data rate of the data provided by the video source encoder to the forward error correction coder while maintaining the predetermined constant transmitting rate of data output from the forward error correction coder.

2. An apparatus in accordance with claim 1, wherein the feedback from the receiving module comprises at least one of a receiving data rate of data received at the receiving module and an error correction decoding status of the received data.

3. An apparatus in accordance with claim 1, wherein:
    the receiving module will provide a receiving status and error correction decoding status of each block of the one or more blocks of error correction coded data to the rate control module.

4. An apparatus in accordance with claim 1, wherein:
    based on the feedback, the rate control module will either modify a block transmitting rate of each of the error correction coded blocks of data, or notify the forward error correction coder to stop sending any additional error correction coded data for that error correction coded block and begin sending data for a next error correction coded block.

5. An apparatus in accordance with claim 2, wherein:
    based on one of a prior or current receiving data rate of the error correction coded data, the video source encoder will modify the encoding data rate.

6. An apparatus in accordance with claim 1, wherein:
    aggregated error correction coded data of the one or more blocks of data is sent at the predetermined constant transmitting rate for each digital data channel, irregardless of an actual bandwidth of the corresponding digital data channel.

7. An apparatus in accordance with claim 1, wherein:
    aggregated error correction coded data of the one or more blocks of data is sent at the predetermined constant transmitting rate for an aggregation of the one or more digital data channels, irregardless of an actual aggregated bandwidth of the digital data channels.

8. An apparatus in accordance with claim 1, wherein:
    the data comprises one of real-time data or stored data.

9. An apparatus in accordance with claim 1, wherein:
    at least one of the one or more digital data channels is a two-way communication channel.

10. An apparatus in accordance with claim 1, wherein:
    the video source encoder comprises a variable rate encoder;
    the forward error correction coder comprises an FEC encoder using rateless erasure codes; and
    a forward error correction decoder and a variable rate decoder are associated with the receiving module.

11. An apparatus in accordance with claim 4, wherein:
    aggregated error correction coded data of the one or more blocks of data is sent at the predetermined constant transmitting rate for each digital data channel, irregardless of an actual bandwidth of the corresponding digital data channel.

12. A method for maximizing utilization of a dynamically varying channel, comprising:
- encoding and transmitting data over one or more digital data channels;
- error correction coding of one or more blocks of the data at a forward error correction coder, the forward error correction coder receiving the data from a video source encoder at an encoding data rate;
- transmitting the one or more blocks of error correction coded data from the forward error correction coder at a predetermined constant transmitting rate over the one or more digital data channels to a receiving module;
- providing a rate control module for controlling the encoding data rate of the video source encoder and for maintaining the predetermined constant transmitting rate of the error correction coded data of the forward error correction coder based on feedback from the receiving module;
- wherein, based on the feedback, the rate control module modifies the encoding data rate of the data provided by the video source encoder to the forward error correction coder while maintaining the predetermined constant transmitting rate of data output from the forward error correction coder.

13. A method in accordance with claim 12, wherein the feedback from the receiving module comprises at least one of a receiving data rate of data received at the receiving module and an error correction decoding status of the received data.

14. A method in accordance with claim 12, wherein:
the receiving module provides a receiving status and error correction decoding status of each block of the one or more blocks of error correction coded data to a rate control module.

15. A method in accordance with claim 12, wherein:
based on the feedback, the rate control module will either modify a block transmitting rate of each of the error correction coded blocks of data, or notify the forward error correction coder to stop sending any additional error correction coded data for that error correction coded block and begin sending data for a next error correction coded block.

16. A method in accordance with claim 13, wherein:
based on one of a prior or current receiving data rate of the error correction coded data, the video source encoder will modify the encoding data rate.

17. A method in accordance with claim 12, wherein:
aggregated error correction coded data of the one or more blocks of data is sent at the predetermined constant transmitting rate for each digital data channel, irregardless of an actual bandwidth of the corresponding digital data channel.

18. A method in accordance with claim 12, wherein:
aggregated error correction coded data of the one or more blocks of data is sent at the predetermined constant transmitting rate for an aggregation of the one or more digital data channels, irregardless of an actual aggregated bandwidth of the digital data channels.

19. A method in accordance with claim 12, wherein:
the data comprises one of real-time data or stored data.

20. A method in accordance with claim 12, wherein:
at least one of the one or more digital data channels is a two-way communication channel.

21. A method in accordance with claim 12, wherein:
the video source encoder comprises a variable rate encoder;
the error correction coded data is produced by an FEC encoder using rateless erasure codes; and
a forward error correction decoder and a variable rate decoder are associated with the receiving module.

22. A method in accordance with claim 15, wherein:
aggregated error correction coded data of the one or more blocks of data is sent at the predetermined constant transmitting rate for each corresponding digital data channel, irregardless of an actual bandwidth of the corresponding digital data channel.

* * * * *

UNITED STATES PATENT AND TRADEMARK OFFICE
CERTIFICATE OF CORRECTION

| | |
|---|---|
| PATENT NO. | : 9,612,902 B2 |
| APPLICATION NO. | : 13/790231 |
| DATED | : April 4, 2017 |
| INVENTOR(S) | : P. Shen |

It is certified that error appears in the above-identified patent and that said Letters Patent is hereby corrected as shown below:

In the Claims

Column 7, Line 33 Claim 14: "more blocks of error correction coded data to a rate" should read -- more blocks of error correction coded data to the rate --

Signed and Sealed this
Twenty-sixth Day of September, 2017

Joseph Matal
*Performing the Functions and Duties of the*
*Under Secretary of Commerce for Intellectual Property and*
*Director of the United States Patent and Trademark Office*